(12) United States Patent
Wasserman et al.

(10) Patent No.: US 8,195,698 B2
(45) Date of Patent: Jun. 5, 2012

(54) HIERARCHY MANAGER FOR MASTER DATA MANAGEMENT

(75) Inventors: Brian J. Wasserman, Escondido, CA (US); Thomas K. Ryan, Valley Center, CA (US); Carl L. Christofferson, Escondido, CA (US); Neelesh V. Bansode, Bangalore (IN); Santosh Kumar Singh, Bangalore (IN); Madhavi Chandrashekar, Bangalore (IN); Vivek Shandilya, Bangalore (IN)

(73) Assignee: Teradata US, Inc., Dayton, OH (US)

( * ) Notice: Subject to any disclaimer, the term of this patent is extended or adjusted under 35 U.S.C. 154(b) by 303 days.

(21) Appl. No.: 12/574,509

(22) Filed: Oct. 6, 2009

(65) Prior Publication Data

US 2010/0088334 A1 Apr. 8, 2010

Related U.S. Application Data

(60) Provisional application No. 61/195,321, filed on Oct. 6, 2008.

(51) Int. Cl.
*G06F 17/30* (2006.01)

(52) U.S. Cl. .......................... 707/793; 707/792; 707/829
(58) Field of Classification Search .................. 707/812, 707/829, 831, 999.101, 792, 793, 796, 999.102
See application file for complete search history.

(56) References Cited

U.S. PATENT DOCUMENTS

| 6,505,205 | B1 * | 1/2003 | Kothuri et al. ........................ 1/1 |
| 7,991,800 | B2 * | 8/2011 | Lawrence et al. .............. 707/803 |
| 2002/0099563 | A1 * | 7/2002 | Adendorff et al. ................ 705/1 |
| 2011/0078201 | A1 * | 3/2011 | Ryan et al. .................... 707/792 |

* cited by examiner

*Primary Examiner* — Monica Pyo
(74) *Attorney, Agent, or Firm* — Gates & Cooper LLP

(57) ABSTRACT

A method, apparatus, and article of manufacture is configured to define a structured view of data in a computer system. A relational database management system (RDBMS) stores information in the computer system. As part of a process and framework, a series of business rules and process workflows that manage data (that is hierarchical in nature) that resides in one or more RDBMS tables are maintained. User input is accepted that defines a hierarchical structure that is projected onto the data. The hierarchical structure is stored as metadata in the RDBMS. The hierarchical structure is utilized to graphically visualize, manage, and manipulate the data.

21 Claims, 7 Drawing Sheets

HIERARCHY MANAGER FOR MASTER DATA MANAGEMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/195,321, filed Oct. 6, 2008, Brian J. Wasserman, Thomas K. Ryan, Carl Christofferson, Neelesh V. Bansode, Santosh Kumar Singh, Madhavi Chandrashekar, and Vivek Shandilya, entitled "Hierarchy Manager for Master Data Management".

BACKGROUND OF THE INVENTION

1. Field of the Invention

This invention relates in general to managing business critical data in a computer, and in particular, to defining and viewing a structured hierarchical view of such data.

2. Description of Related Art

Master Data Management™ (MDM), available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

Part of the business critical master data consists of data that is hierarchical in nature. This data resides in a series of relational database tables that are part of the core master data. The data in these tables is hierarchical in nature, meaning that the data consists of parent-child relationships, generally represented through primary key—foreign key relationships in the underlying data. A common requirement for customers in a master data management context is the ability to manage and manipulate this hierarchical data, and central to this is the necessity to be able to view this data in a visual hierarchy.

Prior art systems provide generalized solutions for viewing and manipulating hierarchical data (e.g., Entreon™). However, the prior art fails to provide a capability to both define a structure of a hierarchy and the ability to view and edit both the data and the hierarchy in an interactive manner. Accordingly, what is needed is the ability to integrate hierarchies, the management of hierarchies, and the visualization and direct manipulation of hierarchies into a Master Data Management solution.

SUMMARY OF THE INVENTION

In order to view business critical master data in a hierarchical manner—thus viewing the underlying data relationships visually—it is first necessary to define the structure of the hierarchy itself. Embodiments of the invention provide for a Hierarchy Manager that is responsible for allowing users to define multiple hierarchies that in turn can be projected on the data, and used to visually present the data to users. The hierarchy definition also governs the interactions that users can have with the hierarchy data.

Embodiments of the invention take the management of hierarchy definitions, and applies the management in a Master Data Management context. Specifically, embodiments allow users to define multiple hierarchies that can then be used to access, visualize, manage, and manipulate their hierarchy data that resides under the control of a Master Data Management Framework and processes.

The Hierarchy Manager captures and stores the multiple hierarchy in definitions as metadata that allows for generalized rules and processes to be applied to the hierarchy or to elements of the hierarchy. The Hierarchy Manager, its integration with MDM, and its storage of the hierarchy definitions as metadata are the keys to the integration of Hierarchies and Master Data Management.

In addition, the data may be presented visually in the hierarchy where users can interact directly with the data, either to view or edit details of the data element, or to drag and drop an item to change its hierarchical parentage. Embodiments of the invention integrate the viewer with the MDM Framework. The metadata layer is leveraged to allow users direct access into the tables (containing the hierarchical data) that are controlled and governed by the Master Data Management Framework. This metadata also allows the Hierarchy Viewer to follow all established Master Data Management rules and processes governing access to the hierarchical data. Prior art hierarchy management applications require customers to extract their hierarchical data from their centralized data store (or Enterprise Data Warehouse). The prior art hierarchical data is then managed and manipulated in a separate physical location, and must be re-integrated with the centralized data store on a periodic basis. Embodiments of the invention allows users to view, visualize, and interact directly with their data while directly in the Master Data Management Framework. The integration of the Hierarchy Viewer with the MDM framework provides an MDM specific implementation of a Hierarchy Viewer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
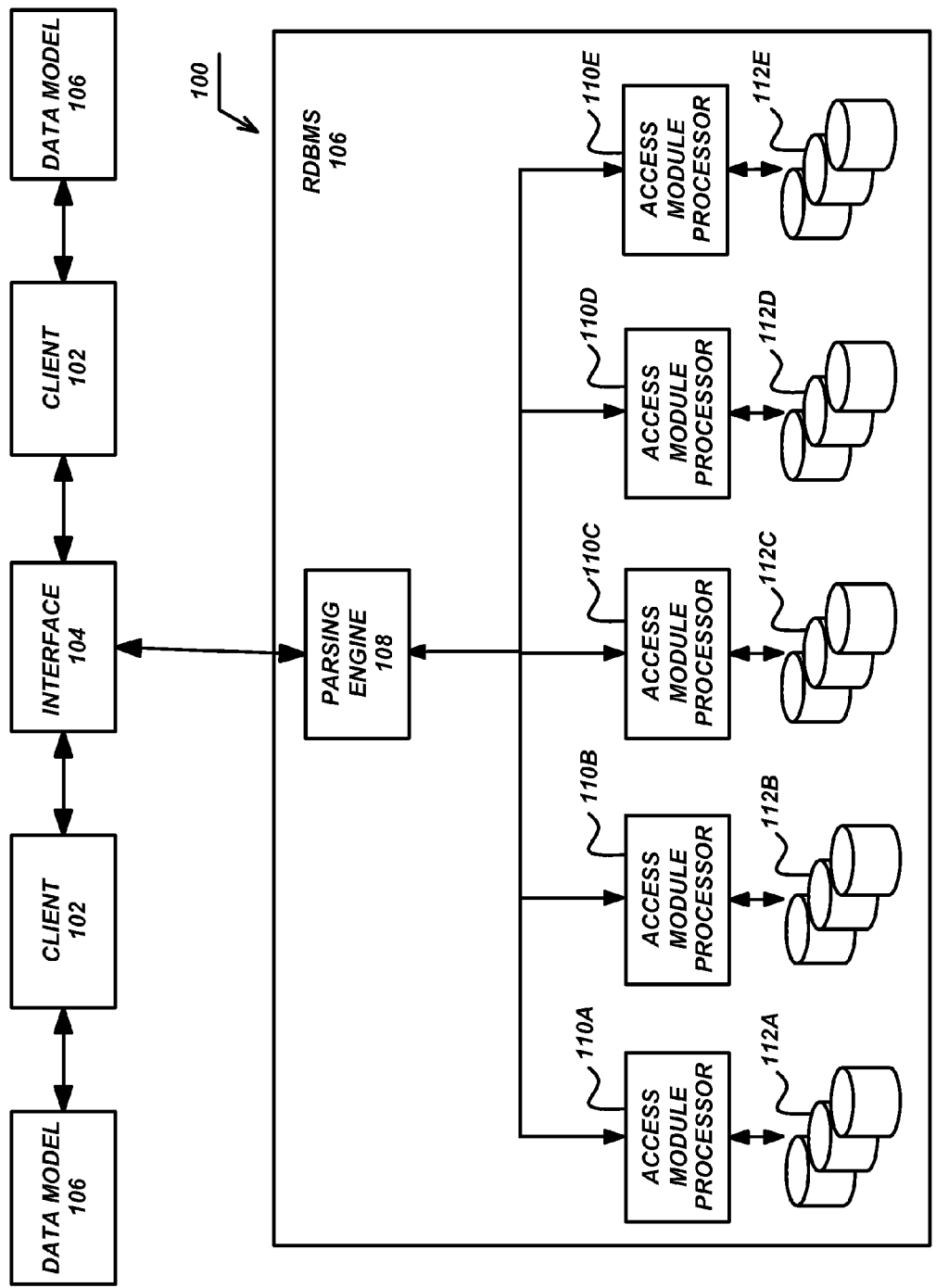
FIG. 1 illustrates an exemplary hardware and software environment according to one or more embodiments of the present invention.

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

One or more embodiments of the invention provide a Hierarchy Manager that is an application that is integrated directly into the Master Data Management (MDM) Framework. The Hierarchy Manager allows users to define dimensions, a hierarchy, hierarchy objects, and hierarchy relationships. Furthermore, the manager provides a direct linkage of the hierarchy and its components to the data that is managed as part of the MDM workflows and processes. Stated in other words, the Hierarchy Manager is responsible for allowing users with the proper authorization to create or modify the structural composition of a hierarchy.

The hierarchy manager may consist of the following high level components:

1. A user interface to allow users to graphically define dimensions, and create hierarchies of data.
2. A metadata repository for storing the hierarchy definitions. This is the key integration point with the overall Master Data Management Framework.
3. A mapping of hierarchy objects directly to tables maintained as part of the Master Data Management Framework.
4. A mapping of hierarchy relationships to primary-key→foreign key relationships expressed in the underlying data.

One or more embodiments may also provide for a Hierarchy Viewer that is an application that is integrated directly into the MDM Framework. The viewer's primary responsibilities is to allow users to visualize the data in a hierarchical fashion. Users can interact directly with this data, access detailed information about specific data elements, or manipulate the data in a way that modifies the hierarchical relationships of the data. To integrate the viewer with the MDM framework, a metadata layer is used to directly access tables and provide a direct linkage of the structure of the hierarchy to its physical location in the MDM framework. Stated in other words, the Hierarchy Viewer is responsible for allowing users with the proper authorization to view hierarchical data in a graphical fashion. The idea is to allow users to visualize their hierarchy data in a natural presentation mode.

The hierarchy viewer may consist of the following high level components:

1. A user interface to allow users to graphically visualize their data in a hierarchical manner. This user interface also allows the user to interact directly with the data, and to manipulate the hierarchy.
2. A metadata repository for storing the hierarchy definitions. This is the key integration point with the overall Master Data Management Framework. This metadata represents a series of hierarchy objects, and their relationship to tables maintained as part of the Master Data Management Framework.

Framework/Workflow Overview

In a Master Data Management (MDM) Framework, all the master data is accessed only by MDM sanctioned data processes, also called "workflows". These workflows are central to the concept of having master data, as they become the only means by which the underlying core data can be modified. Essentially, all inbound data passes through one or more workflows that can perform the following actions on the inbound data:

Perform data quality checks;
Perform data validation;
Perform data transformations (or cleanup of data);
Identify errors in the underlying data and notify the data steward of these issues; and
Migrate data into the Master or "Gold" copy of the data, where it resides in a protected manner.

Hardware and Software Environment Overview

Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ (MDM) framework.

The system of record can take many forms. Many users build a central database (e.g. a data warehouse or operational data store) as a hub through which master data, metadata, and physical data are synchronized. Some hubs are simply master files or tables that collect and collate records.

Regardless of the technology approach, embodiments of the invention provide the ability to deploy a system on any designated target system for testing or production.

FIG. 1 illustrates an exemplary hardware and software environment according to the preferred embodiment of the present invention. In the exemplary environment, a computer system 100 implements an improved MDM framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse as described later in this application, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In the preferred embodiment, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in one or more embodiments, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Hardware and Software Environment Details

As described above with respect to FIG. 1, the master data is stored in RDBMS 106 and is accessed by clients 102 via interface 104. Such client 102 access through interface 104 is enabled by MDM sanctioned data processes referred to as workflows (e.g., provided in interface 104). Rather than being provided via interface 104, such workflows may be provided as part of parsing engine 108 or be provided by the AMPs 110 (or other parts of RDBMS 106). Consumer applications and processes may execute on clients 102 and may need to receive data from the RDBMS 106.

As described herein, the interface 104 to the data may provide a hierarchy manager or hierarchy viewer that provides the ability for users to access, visualize, manage and manipulate the hierarchy data store din the RDBMS 106.

Hierarchy Management

Overview

A hierarchy manager is a feature to MDM that allows users to define a hierarchy structure that effectively mirrors the hierarchical nature of their data. This hierarchy structure can then be used to drive a hierarchy viewer (see below) and drive reporting processes.

Accordingly, the hierarchy manager's provide the ability to define/manage the composition of a hierarchy. This includes the ability to add/delete/modify dimensions, add hierarchies to dimensions, delete hierarchies from dimensions, modify hierarchy information (i.e., name/description), add/modify/delete hierarchy objects, and add/modify/delete hierarchy relationships. Hierarchy management further provides at least two (2) layers of role-based access including a data steward/admin (to make modifications to the structure/composition of the hierarchy and an access layer (to limit access to only view the composition of the hierarchy [e.g., without the option to make changes]). A hierarchy definition (e.g., the hierarchy structure, meaning hierarchy objects and relationships) may be imported from a predefined spreadsheet template. Further, data permissions may be established such that certain users may have privileges (or not have privileges) to see certain categories of data.

As part of the hierarchy management, a data steward may have the ability to explicitly create a version of a hierarchy. Users may be provided with the ability to view earlier versions of a hierarchy, the ability to view data associated with an earlier version of a hierarchy (e.g., if it was archived), the ability to restore an older version of a hierarchy, and the ability to delete old versions. Such versioning capability effectively snapshots the definition of a hierarchy expressed in metadata, for historical purposes. Accordingly, users can choose to snapshot hierarchy data at any point in time (e.g., for later historical comparisons).

Hierarchy Definition and Nomenclature

In an MDM context, a hierarchy is a set of business data (e.g., in the RDBMS 106) that can be organized into a hierarchical structure. The MDM "Hierarchy" captures these data relationships into a formal structure that can be then be used throughout the enterprise 100. In an MDM context, a hierarchy will always point to data contained in the MDM master database (e.g., RDBMS 106). This means that the member data contained in fact tables that comprise a hierarchy is already under management of various MDM workflows and business processes.

A hierarchy consists of the following components:

1. Dimensions—The purpose of a dimension is simply to organize hierarchies into functional areas, such as "CUSTOMER" or "PRODUCT" hierarchies. A single dimension can hold multiple hierarchies.

2. Hierarchy—this is a definition of the data relationships for hierarchical data. Hierarchical data is also known as hierarchy objects, since each data member represents an object that is used for business purposes. The data relationships are referred to as hierarchy relationships, as this denotes how hierarchy objects relate to one another.

3. Hierarchy Objects—A hierarchy object will point to a table in the master database that will contain the actual member data. For example, a hierarchy object of "Customer" will point to the "Customer" table in the master database.

4. Hierarchy Relationships—This formalizes the data relationships between hierarchy objects into the hierarchy, so that it can be used to drive other enterprise processes. As an example, if there are two hierarchy objects: "CUSTOMER" and "HOUSEHOLD", and customers may belong to a household, the data relationship that maps a CUSTOMER to a HOUSEHOLD is represented by the hierarchy relationship "CUSTOMER TO HOUSEHOLD". A hierarchy relationship will always be a primary-to-foreign key relationship in the database.

Figure 2:
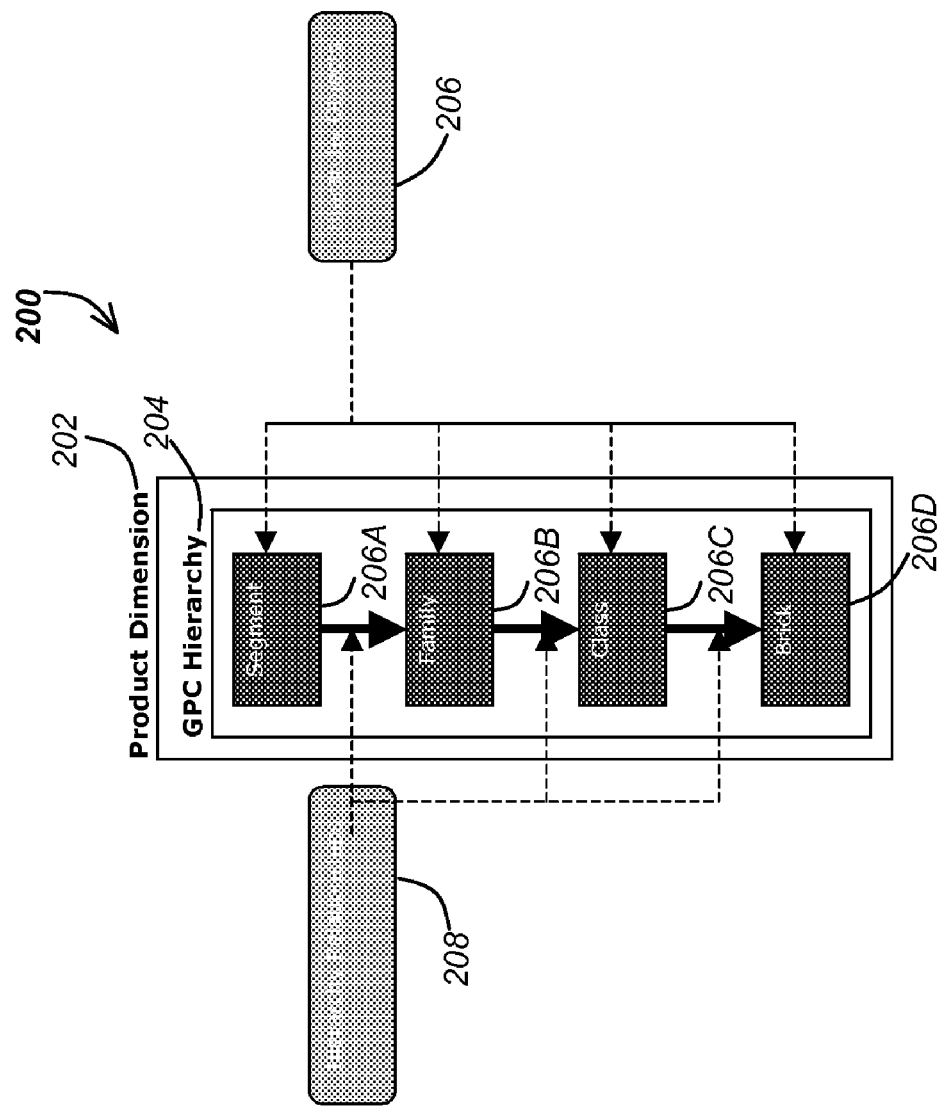
FIG. 2 illustrates an example hierarchy in accordance with one or more embodiments of the invention.

An example of a hierarchy is a Global Product Classification (GPC) hierarchy as illustrated in FIG. 2. Using the above terminology, here is how the GPC hierarchy 200 would be structured:

Dimension: Products 202
Hierarchy: GPC 204
Hierarchy Objects 206:
Segment 206A
Family 206B
Class 206C
Brick 206D
Hierarchy Relationships 208
Segment 206A to Family 206B
Family 206B to Class 206C
Class 206C to Brick 206D In a MDM context, the actual member data—the data that exists in a hierarchical fashion in EDW (Enterprise Data Warehouse) fact tables—is already part of "Master Data". This means that this data is created, modified, and deleted through existing MDM business processes, via MDM workflows.

As mentioned above, this data is already hierarchical in nature. For example, a company already has product data organized into a GPC hierarchical structure, meaning that they already have Segment 206A, Family 206B, Class 206C, and Brick 206D data. This data 206 is organized into tables, in which each table has a primary key. Furthermore, the relationships 208 between data will be expressed as primary-key to foreign-key relationships in the database. Key to this in an MDM context is an assumption that all hierarchy member data 206—other than data that resides at the highest point in the hierarchy 204—has a parent object. Put another way, there are no orphan records. As an example, all Family 206B member data records will have an entry that points back to a parent Segment 206A. There will be no Family 206B member data that does not point back to a Segment 206A.

When new data is introduced, such data may not have a designated parent. For example, if a new family of food products is introduced—"Microwaveable"—and it does not have a designated Segment 206A, embodiments of the invention should provide the ability to handle such new data. In one or more embodiments, as such new data is introduced into MDM via the appropriate workflow, the new record may find its way into an Error table, depending on the validation rules put in place.

In order for this data to be viewed in a GPC Hierarchy 204, this new Family 206B must belong to a Segment 206A. The solution in this case, then, is to add a new Segment 206A, called "Unassigned". In the workflow, a rule would be setup such that any new Family 206B introduced into MDM is automatically assigned to the "Unassigned" Segment, if it does not have a parent Segment 206A already specified.

Hierarchy Mapping

Figure 3:
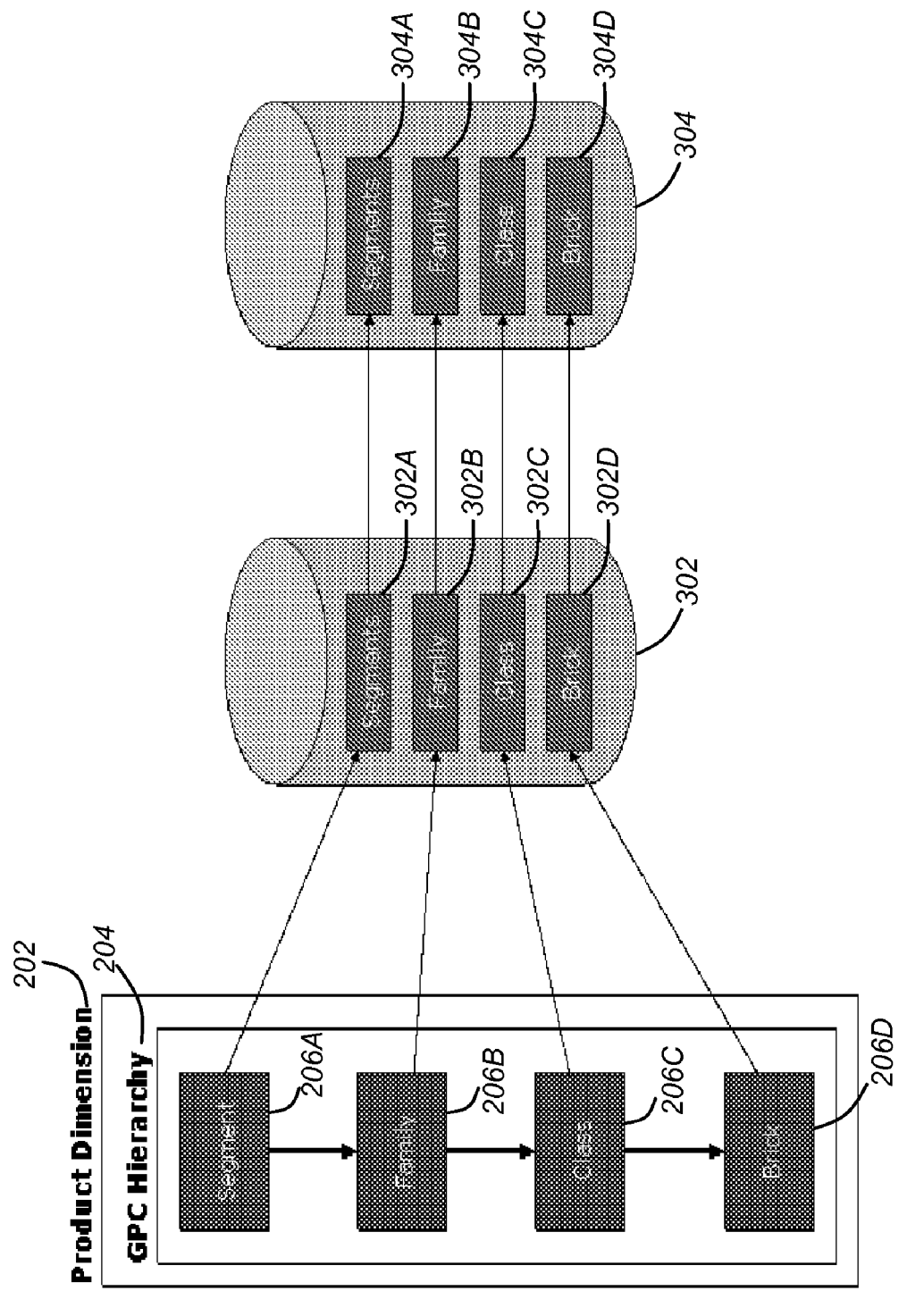
FIG. 3 illustrates a mapping for an example hierarchy in accordance with one or more embodiments of the invention.

The Hierarchy Manager may allow users to define a hierarchy structure that maps a hierarchy to hierarchical data that resides in the master database. Each hierarchy object defined in the hierarchy will map to an XDocument-based table in the master database. This mapping will be done through a primitive database view that will reside in the hierarchy database, a new MDM database. FIG. 3 illustrates a mapping for a GPC Hierarchy in accordance with one or more embodiments of the invention. In this example, the hierarchy manager will be responsible for generating a primitive database view 302A-302D for each hierarchy object 206A-206D that the user creates. This database view 302A-302D resides in the hierarchy database 302, and maps one-to-one to a table 304A-304D in the MDM Master database 304. Just as hierarchy objects 206 map to database tables 302 and 304, hierarchy relationships 208 map to primary-key to foreign-key relationships between the hierarchical data.

Figure 4:
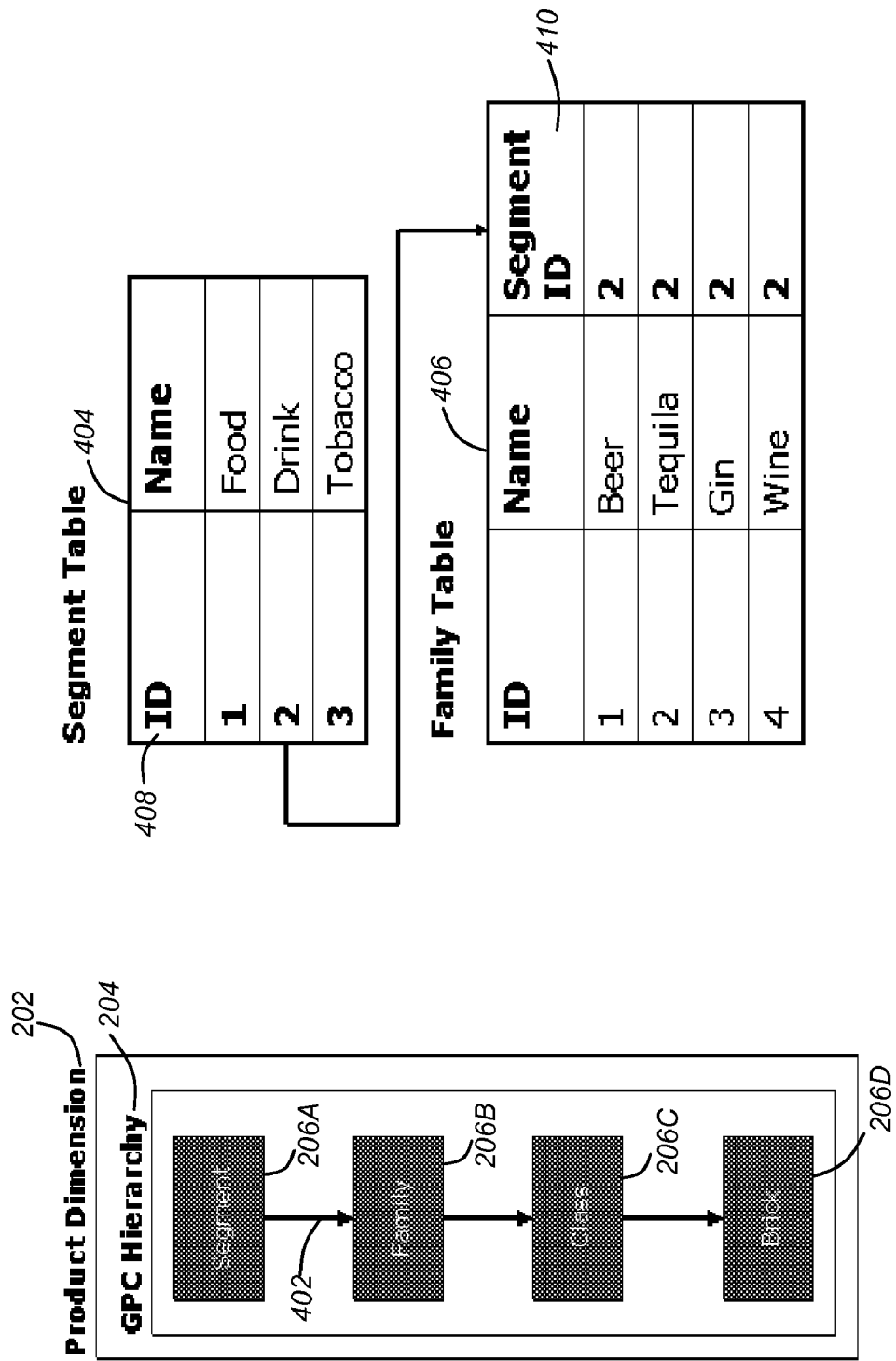
FIG. 4 illustrates a mapping of hierarchy relationships in accordance with one or more embodiments of the invention.

FIG. 4 illustrates a mapping of hierarchy relationships in accordance with one or more embodiments of the invention. Arrows between objects 206A-206D define the relationship of the hierarchy. For example, arrow 402 defines the relationship between Segments 206A and Families 206B. Hierarchy relationships map a data relationship between hierarchy objects. Such mapping is primary key to foreign key joins. A key may also consist of multiple columns. As illustrated the segment table 404 is mapped to the family table 406. The primary key of the segment table is the Segment ID 408, which is mapped to the foreign key—segment ID 410 in the family table 406. Accordingly, entries 1-4 in the family table 406 are all drinks as identified by the foreign key 410 with an entry "2" that maps to the drink tuple in the segment table 404.

Architecture

There are two primary design considerations that affect the overall architecture of the Hierarchy Manager.

The first consideration is that MDM may run entirely within a Web Server, and runs without the need for an Application Server. Strategically, the MDM Program will minimize application server requirements, as appropriate. Additionally, the hierarchy business tier does not require any functionality of the XServer. So strategically, wherever possible, the architectural goal will be to create small, discrete, reusable components that can run by themselves. This will allow the Hierarchy Manager (and Viewer) to be deployed independent of MDM or of an XServer, which makes it possible to deploy the Hierarchy Manager without requiring MDM. Towards this end, the backend business functionality may be implemented through a combination of POJOs (plain old java objects) and possibly Web Service technologies. (Web Services may be needed to more easily interact with Flex based code).

The second consideration is the complexity of the user interface, and the desire to present a standardized user interface for all of the Hierarchy functionality (Manager and Viewer). The Hierarchy Viewer needs to be able to graphically display a hierarchy in multiple layouts, and needs to provide a significant amount of user-interaction (i.e. drag and drop of a member from one parent to another parent). This level of interaction is not possible (at least not without a tremendous amount of work) in standard form based user interface, such as can be found in the majority of MDM products. This includes HTML, JSP (Java™ Server Pages) or PGL based user interfaces. For this reason, Adobe™ Flex™ may be used for the user interface of the Hierarchy Viewer. For consistency in user experience and interaction, Adobe™ Flex™ may also be used for a Hierarchy Manager.

Figure 5:
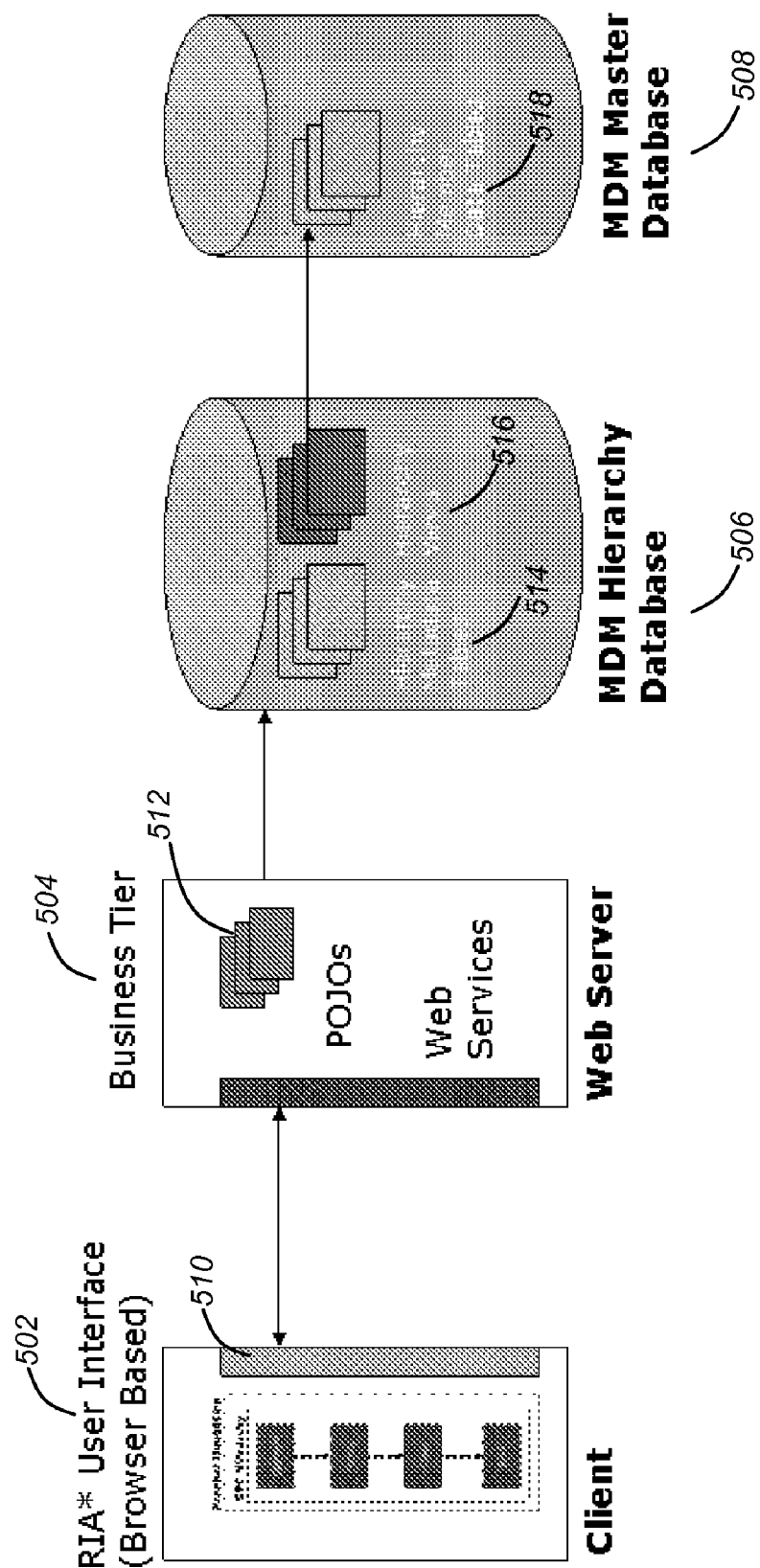
FIG. 5 illustrates the architecture of a hierarchy manager in accordance with one or more embodiments of the invention.

FIG. 5 illustrates the architecture of a hierarchy manager in accordance with one or more embodiments of the invention. Essentially, the Hierarchy will consist of the following components: a user interface 502, a business tier 504, an MDM hierarchy database 506 (e.g., the hierarchy database 302), and the MDM master database 508 (also referred to as master database 304 above).

The user interface 502 may be coded in Adobe™ Flex 2 (MXML and ActionScript 3.0). There will be a thin business delegate layer 510 (and supporting data transfer (or value) objects), which serves to separate the business tier 504 logic from the remainder of the presentation logic 502. This business delegate 510 may be written in ActionScript.

The business tier 504 resides on the web server, and consist of POJOs 512 that handle the majority of the business tier 504 processing. The POJOs 512 are wrapped by a thin web service layer.

The MDM Hierarchy Database 506 is a new database that holds metadata tables 514, hierarchy views 516, and version archives. Metadata tables 514 hold metadata about the Hierarchies. This includes info about the dimensions 202, hierarchies 204, hierarchy objects 206, and hierarchy relationships 208. Hierarchy views 516 are the primitive database views that map directly to a corresponding table in the MDM Master database 508. Version archives (not pictured) are the historical archives of hierarchy versions, and potentially archives of the member data.

The MDM master database 508 contains the MDM master tables 518, which contain the member data of the hierarchy objects 206, as well as the relationships to other hierarchy objects 206. The hierarchy manager may always read and write through the primitive views that exist in the hierarchy database 506. It does not read/write directly to the Master database 508. However, since the master database 508 contains the master data, it is shown for completeness.

As illustrated in FIG. 5, the business logic (e.g., in business tier 504) should be separated from the presentation logic (e.g., in the UI 502). The Flex™ based UI 502 invokes functions or services that reside on the web server (e.g., either as Web Services or POJOs 512). Access to the business functionality may be "wrapped" in a business delegate class (or classes). The UI 502 may also generate custom ActionScript classes and components wherever necessary. In this regard, most of the hierarchy user interface 502 may rely on dynamically generated user interface objects (e.g., ActionScript based components).

The user interface 502 may also be 'skinned' as necessary, so that the appearance of all objects can be specified through a cascading style sheet (.css). In this regard, the appearance may be configured to look and feel similar to other user interfaces. Further, the Flex™ based user interface and all end-user text, prompts, tool-tips, and error messages may be globalized. In addition to the above, the user interface 502 may provide the following abilities: show dimensions; add/modify/delete dimensions; add hierarchies to a dimension; delete a hierarchy from a dimension; edit the structure/composition of a hierarchy; add a hierarchy object; modify a hierarchy object; delete a hierarchy object; edit a hierarchy; add a relationship between hierarchy objects (hierarchy relationships); add/modify/delete hierarchy relationships; and the ability for users to explicitly create a new version of the hierarchy.

The business tier (504) (webserver/J2EE tier) functionality consists of Java™-based functionality that will reside on the MDM web server. All of the Java™-based functionality may be contained in one or more POJOs 512, and be accompanied by any necessary value (or data transfer) objects. The reason for encapsulating the core functionality in POJOs 512 is that this allows one to 'wrap' the functionality with a very thin layer, either via a web service layer, or by a business delegate class. One POJO 512 may be utilized per functional area (e.g., a POJO 512 to handle dimension functionality, one for hierarchy, one for hierarchy object, etc.). The layer wrapping the POJOs 512 may be very thin such that no business functionality is present (such functionality may reside in the POJOs 512). Errors occurring on the server may also be logged. Further, error messages (and other interfaces shown to the user) may be stored in resource bundles.

The business tier 504 may provide the following functions: get/add/delete dimensions from dimension metadata tables; add/delete, get hierarchies for a specific dimension; add/delete a hierarchy object to/from a hierarchy; change the sequence/order of a hierarchy object (may act on multiple hierarchy objects simultaneously); add/delete/modify a hierarchy object from one or more databases; add/delete/modify a hierarchy relationship (e.g., mappings); various Xdocument related functionality including returning data based on a master database definition of a table (e.g., retrieving database and table names, retrieving table columns [primary key or otherwise], validating mappings to ensure unique mappings and proper datatype alignment, etc.). For the hierarchy viewer, business tier 504 functionality may utilize methods in the hierarchy manager, to retrieve (and possibly cache) the hierarchy metadata for a specified hierarchy. Specifically, there may be a single call to retrieve version xxx of a specific hierarchy—this will return a structure containing all of the metadata. This may be passed back to subsequent business methods, to avoid repeatedly looking up this info in the database 506 or 508). Further, additional business methods may be used to retrieve the child data for a specific parent data element (identified with Primary Key info). This business method will form the correct SQL against the views in the MDM Hierarchy database 506 to retrieve the hierarchy data and return it back to the Flex™ client in the user interface 502. In addition, a change parent method in the business tier 504 may be called when the user drags an element from one parent node to another—effectively changing the data in the underlying database.

Metadata defines the various tables to be used to store the data. For example, a dimension table defines a dimension, a hierarchy table defines a hierarchy that belongs to a specific dimension, a hierarchy version contains information about each version of the hierarchy, a hierarchy object table defines a hierarchy object, a hierarchy-to-object mapping table supports the ability to use a hierarchy object in multiple hierarchies, a hierarchy relationship table contains hierarchy relationships (that captures data mappings a PK to FK relationship in the data), and a hierarchy relationship map table maps the primary keys in a parent object to a foreign key in a child object.

Hierarchy Viewer

As described above, the hierarchy viewer provides the ability to visually view and interact with hierarchical data. Accordingly, the viewer is a data visualization feature that allows users to visualize their business critical hierarchical data (e.g., in a visual hierarchy). To utilize the viewer, users select a dimension and hierarchy that results in the display of all top-level member data (from the selected hierarchy).

Each member data object may be implemented as an ActionScript™ component, and allows various actions. Clicking on the expand/collapse icon (top left of the component) causes a fetch (if the data is not already loaded) of the child data, which will be displayed graphically. If the component element is already expanded, then clicking on this icon will instead collapse the tree below that parent (the data can remain loaded on the page). The currently selected node/element may always be highlighted—meaning that its visual display properties may be different (i.e. brighter) than the other elements. Based on role, the user can change the attributes of an element. When a user hovers over an element, a tooltip may display the name and description of the element. The name and description fields (in the underlying fact tables) for each Hierarchy Object should have been identified when the Hierarchy Object was created in the Hierarchy Manager (see above).

The hierarchy viewer may also provide drag and drop functionality. Based on role, users can drag a hierarchy element from one parent to another element at the same level as the parent. As an example, referring to FIG. 2, if a hierarchy 204 contains Segments 206A→Families 206B→Class 206C→Brick 206D, a user can select a Family 206B (with parent Segment 206A), and drag and drop it onto a different Segment 206A: When a user is dragging an element, all legal recipients may become brighter, with non-legal elements fading into the background.

Right-Clicking on a Node/Element in the hierarchy viewer may additional actions. For example, a properties selection may bring up a form that displays the attributes of the element. The data attributes of the hierarchy element are dynamic, based on the contents of the fact table. The data attributes displayed may also conform to existing data permissibility rules contained within MDM. A "Focus Hierarchy" option allows the user to pick a specific element within a hierarchy, and essentially use that as the top-level element of the tree. When the user does this, the rest of the tree disappears, and the hierarchy displayed now starts with the specified element. The intent of this feature is that when working with very large hierarchies, users will want to view/edit a very specific portion of the hierarchy tree. So they will first drill-down through the tree to find the correct lower-level elements, then will focus specifically on those elements. When the user focuses on an element, the active hierarchy may start with the selected element/node. However the entire tree structure may be retained in memory, so that the user can revert back to the entire display if desired. Further, the hierarchy viewer may visually move the hierarchy from a selected element to the top and center while other elements may fade out. An "Entire Hierarchy" option may revert the display back to show the hierarchy of all objects. A "Clear Search Results" option may end the search visualization effects. An "Export Hierarchy" option exports the hierarchy data starting with a selected element, and all child elements, into a spreadsheet or other format.

The hierarchy viewer further provides a graphical tree layout of the hierarchy data. Each element in the hierarchy corresponds to a single row of data in a fact table. Items are connected by visual connectors (i.e. "lines") from parent to child—to assist users in data visualization of their hierarchies. Different layouts such as "a "horizontal" and "vertical" layout may be selected by the user. Further, when users collapse nodes, a layout manager may recapture the available space, so that the hierarchy data is displayed in the sleekest possible layout. In addition, the viewer may allow users to zoom in/zoom out functionality.

Users may be further provided with search functionality where users can select/specify a hierarchy object (or all objects), select a field, select a value, and select a search button that results in the visual highlighting of all elements that match the search requirements (e.g., with other fading into the background).

In addition to the above, data permissions for access to certain elements/attributes of elements may be restricted and may be established using the hierarchy viewer (or the viewer may have permission based access to expose such data to a user). The viewer may further provide role based access to hierarchy viewer functionality. For example, a data steward/admin may have the ability to modify the parentage and edit values of an element (e.g., using drag and drop functionality) while access only users may only view hierarchy/attribute data but cannot modify the underlying table.

The hierarchy viewer may also have the ability to display different versions of data in different manners (to provide a visual comparison for the user). For example, users may be able to select multiple versions that they desire to compare and display side-by-side trees of the selected hierarchies (e.g., in two graphical hierarchy trees). If the user elects to "focus" on a specific element in particular version, all versions being displayed may also "focus" accordingly (if the element exists in other versions). Further, differences between different versions may be color coded (e.g., red for old version, green for new version but not the old version, strikethrough, underscore, etc.).

Figure 6:
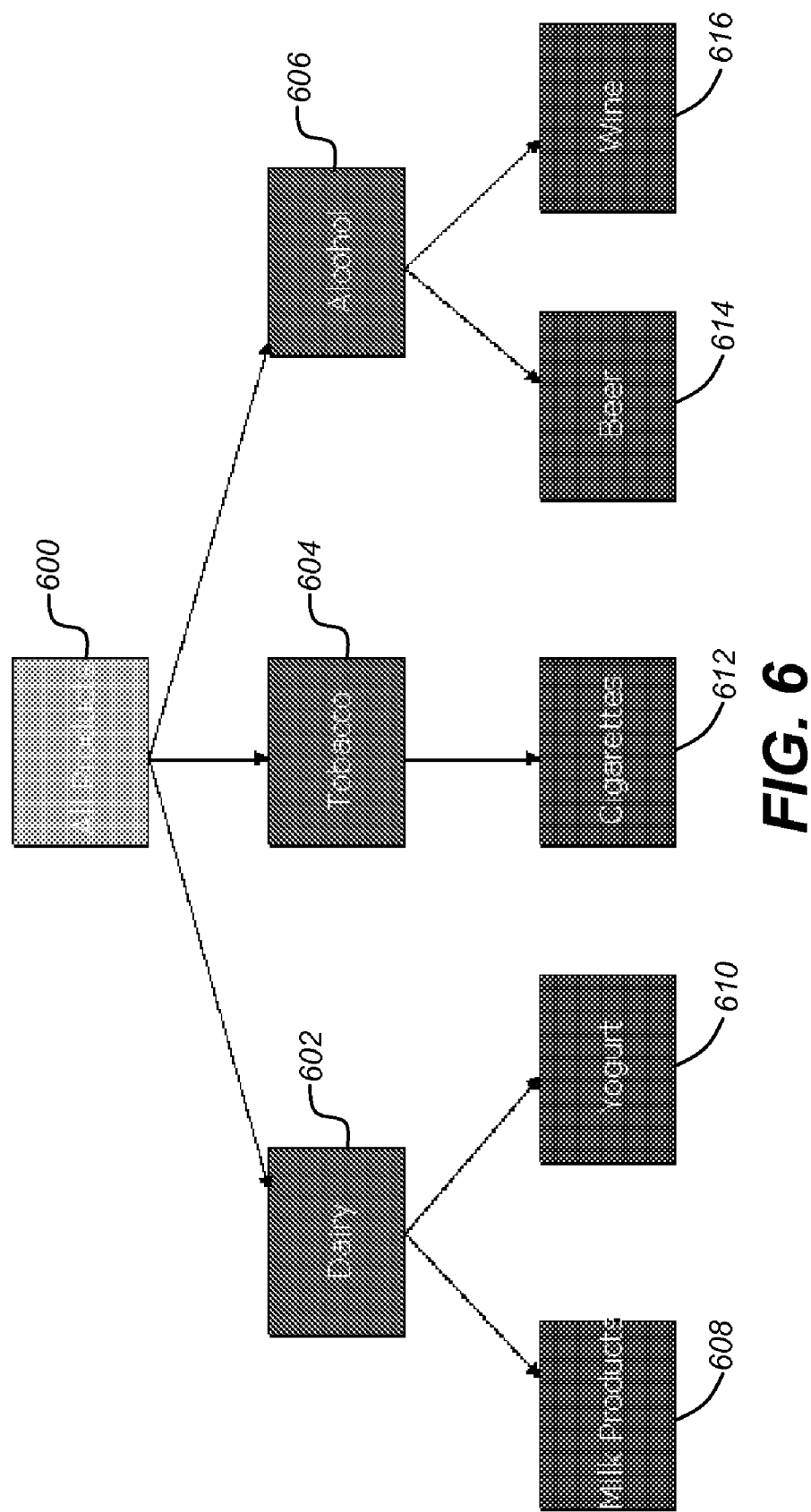
FIG. 6 illustrates a graphical layout/user interface of an example hierarchy that may be displayed in accordance with one or more embodiments of the invention.

Referring to FIG. 5, the hierarchy viewer uses the hierarchy metadata to dynamically build SQL (structured query language) statements that fetch data from the hierarchy database 506. The viewer then displays this data in a graphical layout (e.g., in user interface 502), and allows users to directly interact with the hierarchy. FIG. 6 illustrates a graphical layout/user interface of a GPC hierarchy that may be displayed in accordance with one or more embodiments of the invention. As illustrated, the "All Products" node 600 is displayed at the top of the tree as a parent to "dairy" 602, "tobacco" 604, and "alcohol" 606 products/data elements. The other products 608-616 are displayed beneath the respective category 602-606 as elements or children of the respective category 602-606.

Logical Flow

Figure 7:
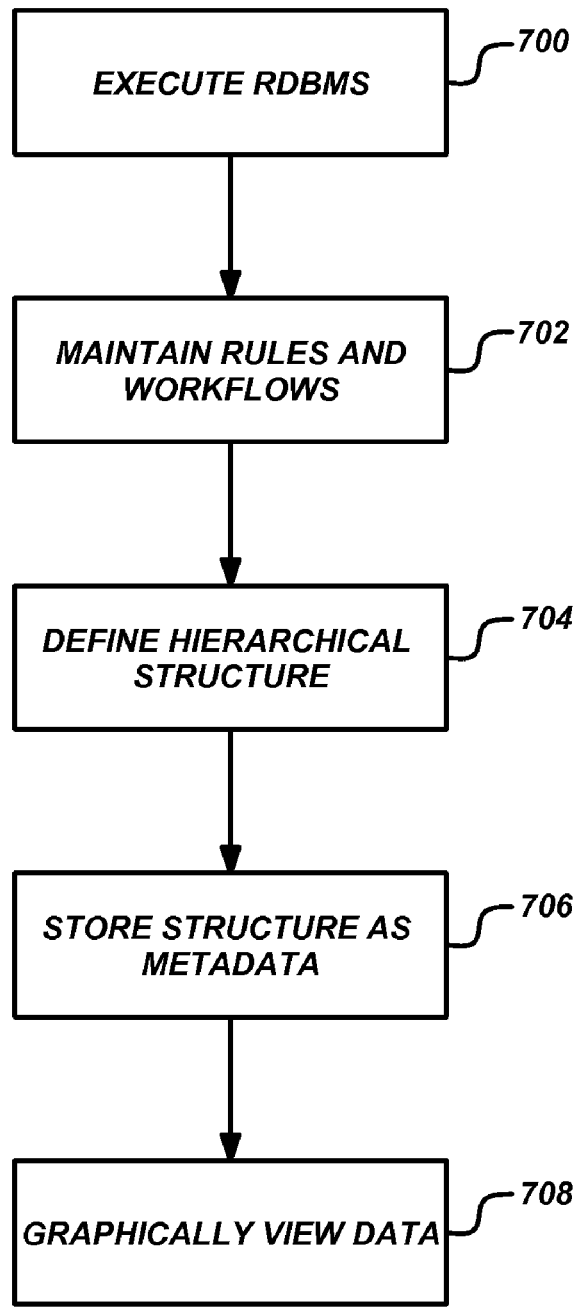
FIG. 7 is a flow chart illustrating the logical flow for defining a structured view of data in a computer system in accordance with one or more embodiments of the invention.

FIG. 7 is a flow chart illustrating the logical flow for defining a structured view of data in a computer system in accordance with one or more embodiments of the invention. At step 700, a relational database management system (RDBMS) is executed/managed in a computer system.

At step 702, as part of a process and framework, a series of business rules and process workflows (that manage data that resides in the RDBMS tables) are maintained. The data that is managed is hierarchical in nature.

At step 704, user input is accepted that defines a hierarchical structure that is projected onto the data. Such user input is conducted via a graphical user interface. The hierarchical structure may consist of one or more dimensions, one or more hierarchies, one or more hierarchy objects, and one or more hierarchy relationships. Each dimension consists of a functional area. Each hierarchy defines a data relationship for one or more hierarchy objects. Each hierarchy object points to one or more of the RDBMS tables. Each hierarchy relationship formalizes a relationship between one or more hierarchy objects in the one or more hierarchies (e.g., a mapping from a primary key to a foreign key). As part of the framework, a mapping may be maintained. Each mapping is of each of the hierarchy objects to the relational database tables. Further, the mapping may be maintained in a hierarchy database. Metadata may be used to dynamically build an SQL statement that fetches data from the hierarchy database that is then displayed in a graphical layout.

At step 706, the hierarchical structure is stored as metadata in the RDBMS. Such metadata may be stored in a metadata repository (within the RDBMS) as part of the framework.

At step 708, the hierarchical structure is utilized to graphically visualize, manage, and manipulate the data.

CONCLUSION

This concludes the description of the preferred embodiment of the invention. The following paragraphs describe some alternative embodiments for accomplishing the same invention. In one alternative embodiment, any type of computer or configuration of computers could be used to implement the present invention.

Hierarchy management provides many advantages, as it offers a new capability that is integrated directly into the Master Data Management Framework. Most Hierarchy Management systems require users to separate their hierarchical data from their business critical data. Hierarchical data is usually processed outside the normal business flow, and must be re-incorporated back into the centralized data store, and re-integrated with their business critical data. Embodiments of the invention directly incorporate hierarchical data into the business critical data that is maintained by Master Data Management processes. In other words, the management and visualization of hierarchical data is directly integrated with Master Data Management. It allows users to define the hierarchy in a decoupled metadata format that allows for hierarchies to be used by other Master Data Management processes. It further allows for customers to view, visualize, and interact with data in a hierarchical format, while allowing this data to remain under the control of the Master Data Management Framework.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for defining a structured view of data in a computer system, comprising:
   (a) executing a relational database management system (RDBMS) that stores the data in the computer system, wherein:
      (i) the RDBMS is part of a framework that is configured to manage and view the data;
      (ii) the data comprises master data that defines and is used to model one or more definitions or views of a business entity;
      (iii) multiple systems define the same business entity in differing data models; and
      (iv) access to the master data is limited to one or more workflow data processes of the framework;
   (b) maintaining, as part of a process and the framework, a series of business rules and the workflow data processes to manage data, wherein the data resides in one or more RDBMS tables, and is hierarchical in nature;
   (c) accepting user input that defines a hierarchical structure that is projected onto the data;
   (d) storing the hierarchical structure as metadata in the RDBMS; and
   (e) utilizing the hierarchical structure to drive a hierarchy viewer, wherein the hierarchy viewer is used to graphically visualize, manage, and manipulate the data in a hierarchical manner.

2. The method of claim 1, wherein:
   (a) the accepting user input is conducted through a graphical user interface; and
   (b) the hierarchical structure comprises:
      (i) one or more dimensions, wherein each dimension comprises a functional area;
      (ii) one or more hierarchies, wherein each hierarchy defines a data relationship for one or more hierarchy objects;
      (iii) one or more hierarchy objects, wherein each hierarchy object points to one of the one or more RDBMS tables;
      (iv) one or more hierarchy relationships, wherein each hierarchy relationship formalizes a relationship between one or more hierarchy objects in the one or more hierarchies.

3. The method of claim 2, further comprising maintaining a mapping as part of the framework, wherein the mapping is of each of the one or more hierarchy objects to the one or more relational database tables.

4. The method of claim 3, wherein the mapping is maintained in a hierarchy database.

5. The method of claim 4, wherein the utilizing further comprises:
   using the metadata to dynamically build a structured query language (SQL) statement that fetches data from the hierarchy database; and
   displaying the fetched data in a graphical layout.

6. The method of claim 2, wherein each hierarchy relationship comprises a mapping from a primary key to a foreign key.

7. The method of claim 1, wherein the metadata is stored in a metadata repository as part of the framework.

8. An apparatus for defining a structured view of data in a computer system, comprising:
   (a) a relational database management system (RDBMS) executing in the computer system, the RDBMS comprises one or more processors, wherein:
      (i) the RDBMS stores the data;
      (ii) the RDBMS is part of a framework that is configured to manage and view the data;
      (iii) the data comprises master data that defines and is used to model one or more definitions or views of a business entity;
      (iv) multiple systems define the same business entity in differing data models; and
      (v) access to the master data is limited to one or more workflow data processes of the framework;
   (b) a master data management system configured to maintain, as part of a process and the framework, a series of business rules and the workflow data processes to manage the data, wherein the data resides in one or more tables in the RDBMS and is hierarchical in nature;
   (c) a hierarchy manager, executing in the computer system configured to:
      (i) accept user input that defines a hierarchical structure that is projected onto the data; and
      (ii) store the hierarchical structure as metadata in the RDBMS; and
   (d) a hierarchy viewer configured to utilize the hierarchical structure to drive a hierarchy viewer, wherein the hierarchy viewer is used to graphically visualize, manage, and manipulate the data in a hierarchical manner.

9. The apparatus of claim 8, wherein:
   (a) the hierarchy manager accepts the user input through a graphical user interface; and
   (b) the hierarchical structure comprises:
      (i) one or more dimensions, wherein each dimension comprises a functional area;
      (ii) one or more hierarchies, wherein each hierarchy defines a data relationship for one or more hierarchy objects;
      (iii) one or more hierarchy objects, wherein each hierarchy object points to one of the one or more RDBMS tables;
      (iv) one or more hierarchy relationships, wherein each hierarchy relationship formalizes a relationship between one or more hierarchy objects in the one or more hierarchies.

10. The apparatus of claim 9, wherein the hierarchy manager is further configured to maintain a mapping as part of the framework, wherein the mapping is of each of the one or more hierarchy objects to the one or more relational database tables.

11. The apparatus of claim 10, wherein the mapping is maintained in a hierarchy database.

12. The apparatus of claim 11, wherein the hierarchy viewer is configured to utilize the hierarchical structure by:
   using the metadata to dynamically build a structured query language (SQL) statement that fetches data from the hierarchy database; and
   displaying the fetched data in a graphical layout.

13. The apparatus of claim 9, wherein each hierarchy relationship comprises a mapping from a primary key to a foreign key.

14. The apparatus of claim 8, wherein the metadata is stored in a metadata repository as part of the framework.

15. An article of manufacture comprising a program storage device readable by a computer, tangibly embodying at least one program of instructions executable by the computer to perform method steps of defining a structured view of data in a computer system, the method steps comprising:
   (a) executing a relational database management system (RDBMS) that stores the data in the computer system, wherein:
      (i) the RDBMS is part of a framework that is configured to manage and view the data;
      (ii) the data comprises master data that defines and is used to model one or more definitions or views of a business entity;
      (iii) multiple systems define the same business entity in differing data models; and
      (iv) access to the master data is limited to one or more workflow data processes of the framework;
   (b) maintaining, as part of a process and the framework, a series of business rules and the workflow data processes to manage data, wherein the data resides in one or more RDBMS tables and is hierarchical in nature;
   (c) accepting user input that defines a hierarchical structure that is projected onto the data;
   (d) storing the hierarchical structure as metadata in the RDBMS; and
   (e) utilizing the hierarchical structure to drive a hierarchy viewer, wherein the hierarchy viewer is used to graphically visualize, manage, and manipulate the data in a hierarchical manner.

16. The article of manufacture of claim 15, wherein:
   (a) the accepting user input is conducted through a graphical user interface; and
   (b) the hierarchical structure comprises:
      (i) one or more dimensions, wherein each dimension comprises a functional area;
      (ii) one or more hierarchies, wherein each hierarchy defines a data relationship for one or more hierarchy objects;
      (iii) one or more hierarchy objects, wherein each hierarchy object points to one of the one or more RDBMS tables;
      (iv) one or more hierarchy relationships, wherein each hierarchy relationship formalizes a relationship between one or more hierarchy objects in the one or more hierarchies.

17. The article of manufacture of claim 16, the method steps further comprising maintaining a mapping as part of the framework, wherein the mapping is of each of the one or more hierarchy objects to the one or more relational database tables.

18. The article of manufacture of claim 17, wherein the mapping is maintained in a hierarchy database.

19. The article of manufacture of claim 18, wherein the utilizing further comprises:
   using the metadata to dynamically build a structured query language (SQL) statement that fetches data from the hierarchy database; and
   displaying the fetched data in a graphical layout.

20. The article of manufacture of claim 16, wherein each hierarchy relationship comprises a mapping from a primary key to a foreign key.

21. The article of manufacture of claim 15, wherein the metadata is stored in a metadata repository as part of the framework.

* * * * *